US012005603B2

United States Patent
Nadezhdin et al.

(10) Patent No.: US 12,005,603 B2
(45) Date of Patent: Jun. 11, 2024

(54) PRODUCTION OF WOOD PARTICLE PANELS RESISTANT TO LIQUID WATER PENETRATION

(71) Applicant: Norbord Inc., Toronto (CA)

(72) Inventors: Aleksander Nadezhdin, Beaconsfield (CA); Claude Ostiguy, Blainville (CA); Elizabeth Cacchione, Saint-Lambert (CA); Karina Martinez Villegas, Montreal (CA); Alain Laplante, Blainville (CA)

(73) Assignee: Norbord Inc., Toronto (CA)

( * ) Notice: Subject to any disclaimer, the term of this patent is extended or adjusted under 35 U.S.C. 154(b) by 20 days.

(21) Appl. No.: 17/558,005

(22) Filed: Dec. 21, 2021

(65) Prior Publication Data

US 2022/0193945 A1     Jun. 23, 2022

Related U.S. Application Data

(60) Provisional application No. 63/128,469, filed on Dec. 21, 2020.

(51) Int. Cl.
  *B27N 7/00* (2006.01)
  *B27N 3/04* (2006.01)
  *B32B 21/02* (2006.01)

(52) U.S. Cl.
  CPC ............. *B27N 7/005* (2013.01); *B27N 7/00* (2013.01); *B32B 21/02* (2013.01); *B27N 3/04* (2013.01); *B32B 2255/08* (2013.01); *B32B 2255/26* (2013.01); *B32B 2607/00* (2013.01)

(58) Field of Classification Search
  CPC ........... B27N 7/00; B27N 7/005; E04C 2/528; E04B 1/625
  See application file for complete search history.

(56) References Cited

U.S. PATENT DOCUMENTS

| 6,231,931 B1 * | 5/2001 | Blazey ............ C09D 4/00 |
| | | 427/393 |
| 7,625,827 B2 | 12/2009 | Egan et al. |
| 7,658,040 B2 | 2/2010 | Bennett et al. |
| 7,677,002 B2 | 3/2010 | Bennett et al. |
| 7,721,506 B2 | 5/2010 | Bennett et al. |
| 7,866,100 B2 | 1/2011 | Bennett et al. |
| 8,900,407 B2 | 12/2014 | Medoff |
| 9,689,159 B2 | 6/2017 | Bennett et al. |
| 10,570,616 B2 | 2/2020 | Sealock et al. |

(Continued)

OTHER PUBLICATIONS

Huber Engineered Woods LLC, "Integrated Water-Resistive Barrier or Housewrap? There is No Question", https://www.huberwood.com/blog/integrated-water-resistive-barrier-or-housewrap-there-is-no-question, retrieved on Dec. 18, 2020, 5 pages.

(Continued)

*Primary Examiner* — Alex A Rolland
(74) *Attorney, Agent, or Firm* — Slater Matsil, LLP

(57) ABSTRACT

A method of can be used to make a wood composite material. The method includes forming a panel having wood fibers and additives, sanding a main surface of the panel, applying a polymer to the sanded main surface of the panel, and curing the polymer by irradiating the main surface of the panel. After the curing, the main surface has a solid discontinuous composite including a mixture of the wood fibers and cured polymer micro-islands.

20 Claims, 3 Drawing Sheets

(56) References Cited

U.S. PATENT DOCUMENTS

| | | | |
|---|---|---|---|
| 10,704,254 B2 | 7/2020 | Seabaugh et al. | |
| 11,105,089 B2 | 8/2021 | Widenbrant et al. | |
| 2007/0294976 A1* | 12/2007 | Fay .................. | E04B 1/0046 |
| | | | 52/515 |
| 2015/0298493 A1* | 10/2015 | Hope .................. | B27N 7/005 |
| | | | 156/60 |
| 2016/0145457 A1* | 5/2016 | Grunewalder ....... | C09D 175/16 |
| | | | 427/372.2 |
| 2017/0151758 A1 | 6/2017 | Lollar et al. | |
| 2020/0047371 A1 | 2/2020 | Laplante et al. | |
| 2020/0095781 A1 | 3/2020 | Norwood et al. | |
| 2020/0199330 A1 | 6/2020 | Maclean et al. | |
| 2021/0171738 A1 | 6/2021 | Maclean et al. | |

OTHER PUBLICATIONS

Idacavage, Mike J., Introduction to the Basics of UV/EB Chemistry and Formulations ṗ SUNY ESF Radiation Curing Program, RadTech NA, Colorado Photopolymer Solutions, Sep. 9, 2015, pp. 1-64.

Swiss Knono, "Finishing OSB: Valuable Information for Users", https://www.swisskrono.de/Building-Materials/Prefabricated-construction/Buildingwith-Engineered-Wood-Products-0305182124.html; retrieved Dec. 7, 2020; 5 pages.

\* cited by examiner

PRODUCTION OF WOOD PARTICLE PANELS RESISTANT TO LIQUID WATER PENETRATION

CROSS-REFERENCE TO RELATED APPLICATIONS

This application claims the benefit of U.S. Provisional Application No. 63/128,469, filed on Dec. 21, 2020, which application is hereby incorporated herein by reference.

TECHNICAL FIELD

The present disclosure relates to the production of wood particle panels that are resistant to liquid water penetration.

BACKGROUND

The use of OSB (oriented strand board) in housing and commercial construction is often associated with the exposure of OSB panels to elements both in storage on the construction site. After erecting the roof and walls, rain and atmospheric moisture can come in direct contact with the outside oriented surface of the exposed panels. The moisture is capable of penetrating the walls and accumulating both inside the bulk volume of the panel and inside the house enclosed space.

In view of this exposure to the elements, it is common to protect the house envelop and structure after being built. Siding is the primary protection from the environment. The OSB surface treated to reduce water penetration is the second layer of protection in case water gets behind the siding due to strong wind, heavy rain, or other factors. This exposure could lead to the swelling of the unprotected OSB panel with detrimental effect on its dimensions and mechanical properties as well as the promotion of the growth of harmful mold and fungi.

Construction panel producers have recognized the need for protecting the house walls and roof against water ingress during construction stage and, at the same time, allowing for the moisture escape from within by allowing for vapor permeability which naturally exists in the case of unaltered OSB panel. The task of defense is being accomplished by creating special panel with one side having a sheet of water-resistant paper adhered thereto. This paper layer allows for certain vapor permeability in order to remove the unwanted moisture from the house during construction and thereafter. This moisture permeable membrane is attached to the outer side of the construction panel in the process of its manufacturing.

SUMMARY

The present invention relates to the production of consolidated wood particle panel, for example, construction panel such as Oriented Strand Board (OSB) with the special feature of resistance to water absorption by the side turned towards the elements during the house construction stage.

In one embodiment, a method of can be used to make a wood composite material. The method includes forming a panel having wood fibers and additives, sanding a main surface of the panel, applying a polymer to the sanded main surface of the panel, and curing the polymer by irradiating the main surface of the panel. After the curing, the main surface has a solid discontinuous composite including a mixture of the wood fibers and cured polymer micro-islands.

In another embodiment, a composite wood panel comprises a core layer sandwiched between first and second outer layers. The core layer comprises wood fibers and a first resin. The first outer layer comprises wood fibers and a second resin that is the same or different than the first resin and the second outer layer comprises wood fibers and a third resin that is the same or different than the first resin and the second resin. The second outer layer has a first main surface and an opposite second main surface. The core layer is disposed between the first outer layer and the second main surface of the second outer layer. The first main surface is designed to be an outer surface of the composite wood panel and comprises a solid discontinuous composite including a mixture of the wood fibers and amorphous polymer islands.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Embodiments of the present invention provide an alternative construction panel product and a way to produce the panel that will have a desirable combination of water resistance and moisture vapor permeability as described above, while avoiding the attachment of the special membrane. Broadly speaking, it is proposed to modify the surface of the OSB panel, which is intended to be oriented towards the outside of the enclosed space, by treating it with a liquid polymer to be sprayed, pooled and/or spread over the top surface of the OSB panel as it comes from the pressing step. This is a secondary manufacturing process. The polymer added to the panel will then undergo essentially instantaneous curing, e.g., while the panel is travelling under a high-energy source, such as UV or electron beam.

Figure 1:
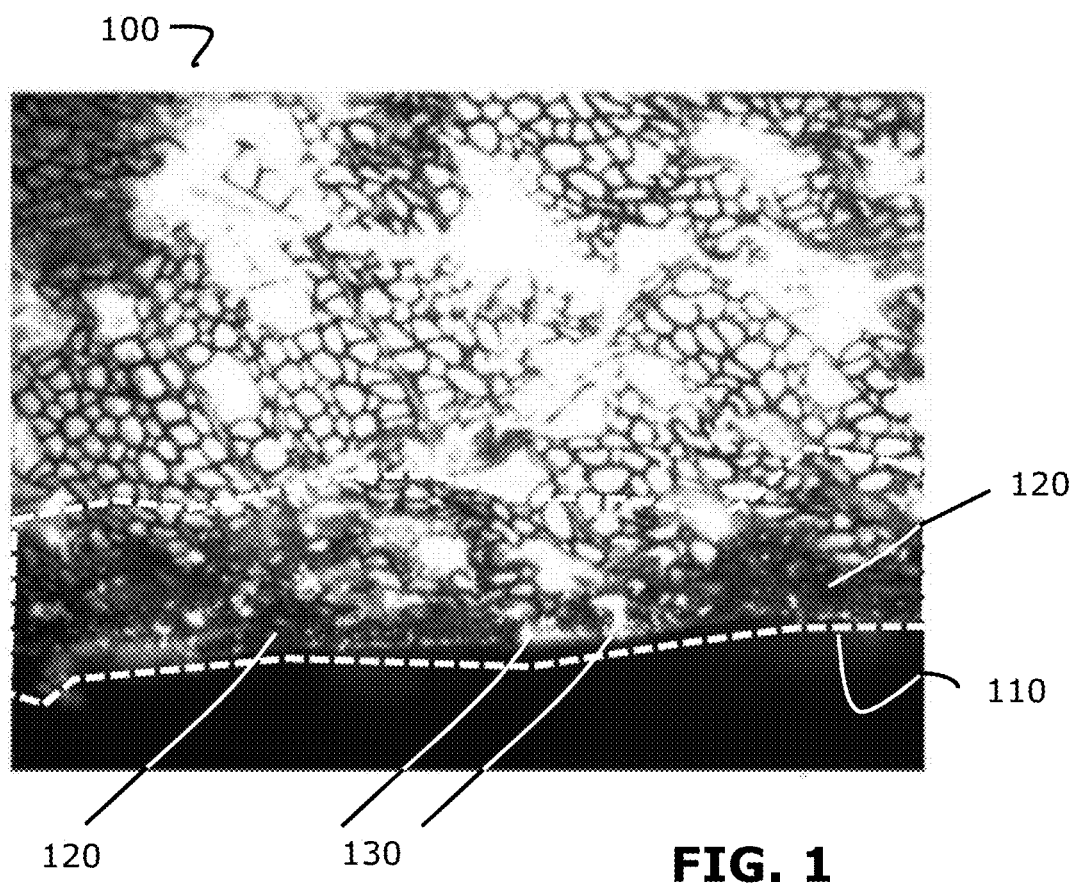
FIG. 1 is a cross-section through the OSB panel thickness with treated layer.

FIG. 1 shows a cross-section through a thickness of an OSB panel 100 that includes a treated layer 110, which outlined by the dashed line in the figure. The amorphous polymer islands 120 are intermittent with the wood fibers 130 so that the wood fibers 130 are characterized by a honeycomb pattern as seen by the lighter shade under the microscope. Two examples of the islands 120 and two examples of the wood fibers 130 are referenced in the figure. This image has a scale of 200:1.

It has been discovered that the surface of a panel can be modified so that it becomes a solid discontinuous composite being a mixture of the wood fibers and cured polymer micro-islands as shown in FIG. 1. The laterally but not continuously dispersed polymer portion 120 of the composite is responsible for the reduction in water penetration, while the wood fibers 130 serve as a conduit for the vapor escape to the outside. In other words, the cured polymer 120 fills the small voids between the fibers 130, which are main conduit for liquid water, while the fibers 130 exposed through the surface serve as the channel for moisture (water vapor) movement.

The obtained composite layer is therefore capable of presenting an effective barrier to water penetration towards the inside of OSB panel 100 and at the same time allowing for vapor permeability of the resulting panel similar to the one before the surface treatment.

Figure 2:
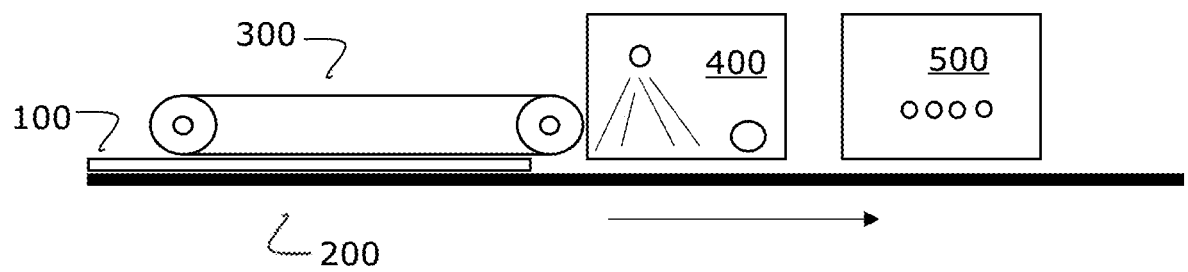
FIG. 2 is a diagram showing a system that can produce a panel according to embodiments.
Figure 3:
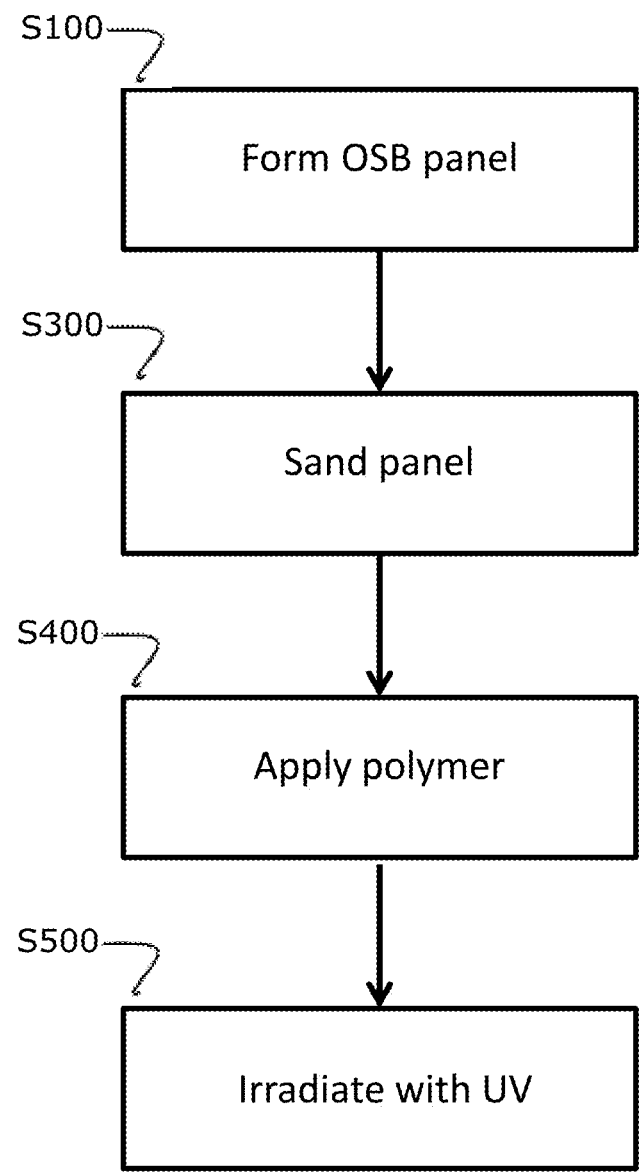
FIG. 3 is a flow diagram showing steps of producing a panel according to embodiments.

FIG. 2 illustrates a method of producing an OSB panel according to an embodiment of the invention. FIG. 3 illustrates a corresponding process flow. In this example, an OSB panel 100 is manufactured (S100) is carried on a conveyor belt 200. The OSB panel 100 sequentially passes sanding equipment such as a sander 300, a polymer applicator 400 and an irradiation tool 500.

The OSB panel 100 is formed in step S100. As is known, the panel is formed from cross-oriented layers of thin, fibers or rectangular strips that are blended with wax and synthetic resin adhesives and bonded together by heat and pressure. The starting material can be naturally occurring hard or soft woods, singularly or mixed. The wood may be dry (e.g., a moisture content of between about 2 wt % and about 12 wt %) or green (e.g., a moisture content of between about 30 wt % and about 200 wt %) or something in between (e.g., a moisture content of between about 12 wt % and about 30 wt %). Throughout this description, all ranges are inclusive. The modifier "about" generally refers to +/−5%.

Figure 4:
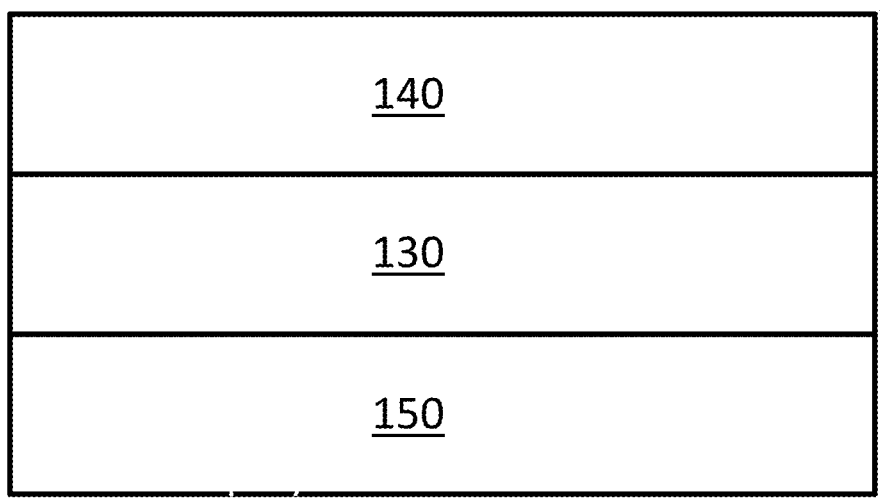
FIG. 4 is a simplified diagram of a three layer OSB panel.

As shown in FIG. 4, a typical OSB panel will include at least a core layer 130 sandwiched between two outer layers 140 and 150. The fibers are typically oriented so that the outer layers are aligned to the panel's strength axis while the core is perpendicular. Additional layers may also be included. The view shown in FIG. 1 can be a main surface of either layer 140 or layer 150 or both.

The resin included in the layers can be a phenolic resin or polymeric methylene diphenyl diisocyanate (pMDI), as examples. For instance, the phenolic resin can be a phenol formaldehyde resin (PF) present in the amount of about 1.5 to about 6 wt % by weight of the strands. The PF resin could include cost-reducing diluents such as Urea, Methanol, Melamine, as but three examples. In one specific example, the phenolic resin can include Melamine urea phenol formaldehyde (muPF) resin, e.g., up to about 50% muPF resin based the weight of the phenolic resin with the remainder of the phenolic resin being phenol formaldehyde (pf). In another example, the resin can be pMDI resin in the amount of about 1.2 to about 6 wt % based on the weight of the strands. As described in US 2017/0151758, different layers may include different types of resins.

The resins can be cured by placing the panel in a thermal press to compress the flakes and bond them by heat activation and curing of the resin that has been coated on the flakes. In a typical thermal press operation, the panel is heated at a temperature that causes water contained in the wood material to be vaporized, e.g., about 180 to about 220° C. for between 2 and 5 minutes.

In a preferred embodiment, the surface to be treated is the subject to a sanding operation in step S300. The sanding is used to reduce out-of-flat areas on the inherently wavy standard OSB surface for two purposes: a) to create microscratched surface for better contact with liquid polymer, and b) to reduce the amount of liquid polymer necessary for even distribution over the flat surface. The grit used in sanding can typically range from 60 to 120. In one example, a $15/32"$ OSB is sanded on one side (S1S) to $7/16"$ using an 80 grit finish creating a relatively smooth surface. Other implementations are possible.

In another embodiment, which is less preferred, the sanding step can be skipped so that a non-sanded surface of the panel is coated.

The polymer addition technique of step S400 might be either one or a combination of different methods known to the practitioners of the art, such as spraying, curtain coating, flooding, or roller coating (direct and reverse rolling). Equipment used to apply the UV coating can include spray nozzles (e.g., spray booth), curtain coaters, reverse coaters, inert coaters and roll coater. In some embodiments, a fresh sanding can be performed prior to the UV coating to get a smooth finish to lower the coating amount.

Coating known to those of skill in the art can be used. One example uses a 100% active UV coating. For example, the formulation can include an initiator, a polymer, a monomer and, optionally, a dye). In another example, a water-based UV coating can be used. In that case, an oven is used to evaporate the water. In both of these examples, the curing can be done using UV lamps.

Two specific examples of application technology will be described. In the first, a spray technology (1 coat and 2 coats) uses a water based UV. The oven first removes the water (50° C. to 80° C., e.g., 60° C.) and the UV lamps are used to complete curing. In a first example, the gun is set at an opposite angle and 80 g/m$^2$ of a water based UV (e.g., WUV-TX02) is sprayed. In a second example, the gun is direct at a −90° angle and 80 g/m$^2$ of a water based UV coating is sprayed. A third example, uses two coats where the gun is direct at a −90° angle and 80 g/m$^2$ of a water based UV coating is sprayed. In various embodiments, between 40 g/m$^2$ and 100 g/m$^2$ of the coating can be sprayed.

In a second example, a spray technology is used with 100% UV. In other words, more spray is applied and the excess is removed with the reverse roll. In a first example, one coat is sprayed at 100 g/m$^2$ SG-03-53 followed by a reverse roll (54 g/m$^2$ total UV). A pick up roll is used to recover the excess UV cure. A second example uses the application of two coats. The first coat is sprayed at 54 g/m$^2$ and the second coat is sprayed at 25 g/m$^2$ (SG-03-53). To get a Gel cure, a gallium UV lamp is used at 300 mJ can be used. To get a full cure, a gallium and mercury lamp is used at 700-800 mJ.

Direct and reverse rolling is schematically shown in FIG. 2 by having two different items depicted inside the polymer application unit 400. As an option, the polymer applied may contain a compatible dye in order to permanently and clearly mark the treated surface to be placed facing outside of the constructed house. This dye should be essentially, or at least somewhat transparent to the UV rays, in order to avoid optical interference with the subsequent curing stage. For example, a green dye can be added to the UV chemistry to see the coverage and add a visible look to the panel. The color and intensity can be changed as desired.

In step S500, the panel is irradiated with, e.g., ultraviolet rays. The radiation tool 500 can be a lamp that emits light in the UV wavelength. In general, any conventional UV radiation tool can be utilized.

In the example described above, the OSB-based construction panel has one surface intended to be oriented towards the outside of the enclosed space. This surface is rendered by sanding, treating with curable polymer liquid spread uniformly, and cured by passing through the stage of high energy curing of the liquid. As a result, the product has one surface substantially resistant to liquid water penetration under ambient conditions.

In one example, the panel is characterized by a vapor permeability in a range from about 0.1 U.S. perms to about 12 U.S. perms as determined by ASTM E96 method B (at 75° F.-100% RH), and a liquid water transmission rate from about 1 to about 28 grams/100 in$^2$/24 hours via Cobb ring according to the test method described in ASTM D5795. The polymer addition rate can be in the range of about 40 g/m² to about 120 g/m² to satisfy those requirements simultaneously.

A first particular example will now be described.

A conventional sanded OSB pane has been treated by using the commercial UV curable liquid polymer and cured by passing it under UV emitting source. The UV curable polymer was applied using two passes of combined spray and rolling to even the spread, prior to passing under UV light.

The panel was then tested for water transmission through the treated surface according to ASTM D5795 Cobb-ring test as described below and for water vapor permeability in accordance to ASTM E96, method B. This testing was conducted in parallel with one involving an untreated but otherwise identical sanded OSB panel as a control. The results of testing were also compared to those conducted on a commercial product where the desired water barrier had had been created by attaching of the specialty membrane.

The results in the above examples are provided listed in Table 1 and Table 2. The results demonstrate a substantial decrease in water through surface penetration. At the same time, vapor permeability is equal to that of the untreated panel and possibly better than that of the commercial panel with the membrane attached.

TABLE 1

Results of water transport tests

| Material | The doze of polymer | 24 h Cobb unit | 48 h Cobb unit |
| --- | --- | --- | --- |
| Sanded OSB | — | 88 | 204 |
| Sanded OSB treated with UV polymer | 80 g/m² | 9 | 22 |
| Commercial product with membrane attached | — | 12 | 26 |

It should be noted that a substantial resistance of the treated surface layer to water penetration is ten times less than that of untreated conventional OSB and even slightly less than the one of the existing commercial panels with a water-resistant membrane attached.

TABLE 2

Results of vapor permeation tests (ASTM E96, method B)

| Material | The dose of polymer | Water vapor transmission, gr./h/ft² | Permeance (perms) |
| --- | --- | --- | --- |
| Sanded OSB | — | 2.67 | 6.1 |
| Sanded OSB treated with UV polymer | 54 g/m² | 2.49 | 5.52 |
| Commercial product with membrane attached | — | 1.44 | 3.20 |

As shown in Table 2, the vapor permeability of the surface treated panel is slightly lower than that of the untreated OSB but is more permeable to vapor than the commercial product used for comparison. In this case, the higher the permeability is the better for the expected service.

For the Cobb ring test (ASTM D5795), a PVC ring is glued onto the panel surface and one inch of water is added into the ring. The gain in panel weight after 24 hrs and 48 hrs is reported.

Further testing has been performed to demonstrate the efficacy of the described processes. In particular, five full 4'×8' samples of each of three profiles (i.e., a total of 15 boards) were tested. The panels came very close to the target weights for each step of the process. The three profiles were 1. Two coat system: spray/pick up roller/cure+spray/pick up roller/cure
2. Two coat system: spray/pick up roller/cure+roll coat sealer 20 gr/cure
3. Three coat system: spray/pick up roller/cure+spray/pick up roller/cure+roll coat sealer 20 gr/cure.

The recipes used for each of these profiles will now be described.

First Spray: The spray was consistently able to achieve 100 g/sqm or 9.3 g/sqft using Graco G40 AA guns and 819 (0.19 orifice) tips. Smaller tips, e.g., 815 (0.15 orifice), were prone to clogging. The line speed was 4.0 m/min and the reciprocation speed was set at 1250 mm/sec. The pump pressure remained low at around 350 PSI.

First Wipe-Off: After the spray, a first wipe off was performed to a target 54 g/sqm (or a removal of 46 g/sqm). The process was able to wipe off 40-45 g/sqm consistently with the roller at its maximum speed of 25 m/min and a down pressure of 0.6 mm. The line speed was 12 m/min.

First Gel: All three profiles received about 300 mJ UVA with gallium only. With a UVR-2 curing oven, this dose corresponded to 120% lamp power at 12 m/min.

Second Spray: For the first and second profiles, another spray of 100 g/sqm was applied, making a total weight 140-145 g/sqm for these test boards. The remaining parameters were the same as the spray described above.

Second Wipe-Off: A second wipe-off was performed for the second and third profiles to wipe off to a total second application of about 25 g/sqm (about 75 g/sqm removal). This step achieved about 80 g/sqm removal with an added down pressure of 0.8 mm (same speed of 25 m/min). A slightly higher removal was cleared for the test. Such a high removal for the second pass leads to more of the 'holes' in the board remaining filled, which is desirable.

Second Gel: A second gel step was preformed for the first and third profiles in a manner as described with respect to the first gel.

Application Roll: An application of 20 g/sqm was performed for the first and third profiles at 12 m/min using a 25 Shure roller with a down pressure of 1.5 mm. A small amount was thereby applied to the highest regions of the board.

Full Cure: A full cure using Mercury and Gallium lamps was used. At 120% Ga and 100% Mercury the result was about 600 mJ UVA at 12 m/min.

While described herein in the context of OSB, it is understood that the concepts disclosed could apply to other wood composite materials, i.e., any composite material that includes wood and additives. Examples other than OSB include waferboard, particleboard, chipboard, medium density fiberboard, plywood, and boards that are a composite of strands and ply veneers.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of making a wood composite material, the method comprising:
    forming a panel comprising wood fibers and additives;
    sanding a main surface of the panel;
    applying a polymer to the sanded main surface of the panel; and
    curing the polymer by irradiating the main surface of the panel, wherein, after curing, the main surface comprises a solid discontinuous composite including a mixture of the wood fibers and cured polymer micro-islands.

2. The method of claim 1, wherein forming the panel comprises forming an oriented strand board (OSB) panel having a core layer sandwiched between a first outer layer and a second outer layer, the main surface being an external surface of the second outer layer.

3. The method of claim 1, wherein sanding the main surface comprises sanding with a grit finish between 60 and 120.

4. The method of claim 1, wherein applying the polymer comprises performing a spraying process, a curtain coating process, a flooding process, or a roller coating process.

5. The method of claim 1, wherein applying the polymer comprises applying a 100% active UV coating that includes an initiator, a polymer, and a monomer.

6. The method of claim 1, wherein applying the polymer comprises applying between 40 g/m$^2$ and 120 g/m$^2$ of polymer onto the main surface.

7. The method of claim 6, wherein, after the irradiating, the main surface is characterized by a vapor permeability in a range from about 0.1 U.S. perms to about 12 U.S. perms as determined by ASTM E96 method B and a liquid water transmission rate from about 1 to about 28 grams/100 in$^2$/24 hours according to the test method described in ASTM D5795.

8. The method of claim 1, wherein, after the irradiating, the main surface is characterized by a vapor permeability in a range from about 0.1 U.S. perms to about 12 U.S. perms as determined by ASTM E96 method B.

9. The method of claim 1, wherein, after the irradiating, the main surface is characterized by a liquid water transmission rate from about 1 to about 28 grams/100 in$^2$/24 hours according to the test method described in ASTM D5795.

10. The method of claim 1, wherein applying the polymer comprises applying two coats of the polymer.

11. The method of claim 10, wherein applying and curing the polymer comprises in the stated order:
    performing a first spraying step;
    removing excess polymer from the first spraying step using a pick up roller;
    performing a first cure;
    performing a second spraying step;
    removing excess polymer from the second spraying step using a pick up roller; and
    performing a second cure.

12. The method of claim 10, wherein applying and curing the polymer comprises in the stated order:
    performing a first spraying step;
    removing excess polymer from the first spraying step using a pick up roller;
    performing a first cure;
    roll coating a second polymer layer; and
    curing the second polymer layer.

13. The method of claim 1, wherein applying the polymer comprises applying three coats of the polymer, applying and curing the polymer comprising in the stated order:
    performing a first spraying step;
    removing excess polymer from the first spraying step using a pick up roller;
    performing a first cure;
    performing a second spraying step;
    removing excess polymer from the second spraying step using a pick up roller; and
    performing a second cure;
    roll coating a third polymer layer; and
    curing the third polymer layer.

14. The method of claim 1, further comprising applying a dye to the main surface at the same time as applying the polymer.

15. A method of making a wood composite material, the method comprising:
    forming an OSB panel comprising wood fibers and additives;
    sanding a main surface of the panel with a grit finish between 60 and 120;
    applying between 40 g/m$^2$ and 120 g/m$^2$ of a water-based UV polymer to the sanded main surface of the panel using a spray technology;
    heating the panel at a temperature between 50° C. and 80° C. to remove water from the polymer; and
    curing the polymer by irradiating the main surface of the panel with UV radiation, wherein, after curing, the main surface comprises a solid discontinuous composite including a mixture of the wood fibers and cured polymer micro-islands.

16. The method of claim 15, wherein applying the polymer comprises spraying between 40 g/m$^2$ and 100 g/m$^2$ of the polymer using a spray gun directed at a −90° angle relative to a plane of the main surface of the panel.

17. The method claim 15, further comprising applying a second coat of the water-based UV polymer prior to curing the polymer.

18. A method of making a wood composite material, the method comprising:
    forming an OSB panel comprising wood fibers and additives;
    sanding a main surface of the panel;
    applying between 79 g/m$^2$ and 120 g/m$^2$ of a UV polymer to the sanded main surface of the panel using a spray technology;
    removing excess polymer from the main surface; and
    curing the polymer by irradiating the main surface of the panel with UV radiation, wherein, after curing, the main surface comprises a solid discontinuous composite including a mixture of the wood fibers and cured polymer micro-islands.

19. The method of claim 18, wherein applying the UV polymer comprises applying the two coats of the UV polymer.

20. The method of claim 18, wherein curing the polymer comprises first using a first UV lamp at a first power level to get a gel cure and then using a second UV lamp at a second power level to get a full cure, the second power level greater than the first power level.

* * * * *